United States Patent [19]

Acuna

[11] Patent Number: 4,993,168

[45] Date of Patent: Feb. 19, 1991

[54] ANCHOR BOLT MARKER

[76] Inventor: Thomas J. Acuna, 1353 Virginia, Berkeley, Calif. 94702

[21] Appl. No.: 425,242

[22] Filed: Oct. 23, 1989

[51] Int. Cl.[5] ........................ B23B 49/02; B25H 7/04

[52] U.S. Cl. ........................................ 33/666; 33/42; 33/613; 33/574

[58] Field of Search .................. 33/613, 42, 516, 644, 33/666, 41.1, 574

[56] References Cited

U.S. PATENT DOCUMENTS

| | | | |
|---|---|---|---|
| 1,904,242 | 4/1933 | Kieckheafer | 33/670 |
| 3,406,460 | 10/1968 | Colwell | 33/574 |
| 4,363,173 | 12/1982 | Caldera | 33/666 |
| 4,520,571 | 6/1985 | Harding | 33/42 X |

*Primary Examiner*—Harry N. Haroian

*Attorney, Agent, or Firm*—Bruce & McCoy

[57] ABSTRACT

An anchor post or bolt marker including a base member which supports a reciprocating marking punch perpendicular thereto for marking anchor bolt positions when it is actuated.

7 Claims, 5 Drawing Sheets

ANCHOR BOLT MARKER

BACKGROUND OF THE INVENTION

1. FIELD OF THE INVENTION

The present invention relates to hole markers for indicating the location of holes to be drilled in a wood plate, and more particularly, to an anchor bolt marker for marking the location of a series of holes to be drilled in a wood plate to permit the plate to be placed over a series of fixed position anchor or tie down studs.

2. DESCRIPTION OF THE PRIOR ART

When erecting buildings, it is often necessary to lay a wood plate on a surface such as a cement floor which has a multiple of fixed position steel anchor posts or tie down bolts projecting from the surface in the form of studs. In order to lay the wood plate on the surface over the studs, it is obvious that it is necessary to drill holes through the board so that the studs can project therethrough. The problem is in drilling the holes accurately and quickly. These bolt studs or anchor posts can be located in a random orientation or with a semipreplanned orientation, but in almost all cases, variances in location render their pattern irregular to a degree that requires individual marking of each anchor bolt on the plate before it can be drilled and put in position over the studs.

Prior to the present invention, it was necessary to lay the plate alongside the studs on a guide line and measure the distance of each stud hole inboard from the edge of the plate, a predetermined distance. Generally the plates consist of either a two-by-four or a two-by-six board of varying lengths which need to be placed over the bolt or anchor studs. Because of these standard sized boards, it is known just how far from the edge of each board that the hole must be drilled in order to properly locate it on the plate. However, measuring each stud hole for its position individually is a time-consuming process.

The present invention is a variable template which can adapt to different diameter studs and to the two different standard sized plates most commonly used. Inherent in the template is a captured marking tool which can be struck by a hammer or other object to mark the wooden plate for the position of the hole once the template has established where it should be located. The present invention also permits moving the marking punch to two different positions to accommodate the most common two different width standard size plates. An adopter allows the device to be utilized with additional standard size board widths.

SUMMARY OF THE INVENTION

The present invention is a hole marker for marking the location of holes to be drilled in a wood plate to permit the plate to be placed over a series of fixed position anchor post or bolt studs. It comprises a base member having a positioning end formed integral thereto for engaging the fixed position studs. The base member is formed for supporting a marking punch perpendicular thereto in spaced relation to the positioning end of the base member. It is also formed for permitting the marking punch to penetrate through the base member to mark the wood plate. The marking punch is supported in perpendicular reciprocating relation to the base member and has a lower end formed to mark positions for holes to be drilled in a wood plate. A spring means is provided for biasing the lower end of the marking punch to a retracted location within the base member when it is not marking hole positions on a plate.

OBJECTS OF THE INVENTION

It is therefore an important object of the present invention to provide a new and novel anchor bolt or post marker for marking the location of holes to be drilled in a wood plate to permit the plate to be placed over a series of fixed position anchor post or bolt studs.

It is another object of the present invention to provide a anchor bolt marker for marking the location of holes to be drilled in a wood plate by means of a marking punch which is integral to the anchor bolt marker and which can be struck by a hammer or other object to mark the plate, and it automatically resets itself for the next marking operation.

It is a further object of the present invention to provide a anchor bolt marker for marking the location of holes to be drilled in wood plates which can be of at least two variable standard sizes, and the marking of the two different sized plates can be accomplished by simple adjustable relation inherent in the structure of the anchor bolt marker.

It is still another object of the present invention to provide a anchor bolt marker which has a handle that permits the marker to be picked up and moved and repositioned as well as held in position while the marking punch is actuated.

Other objects and advantages of the present invention will become apparent when the apparatus thereof is considered in conjunction with the accompanying drawings.

DESCRIPTION OF THE PREFERRED EMBODIMENT

Figure 1:
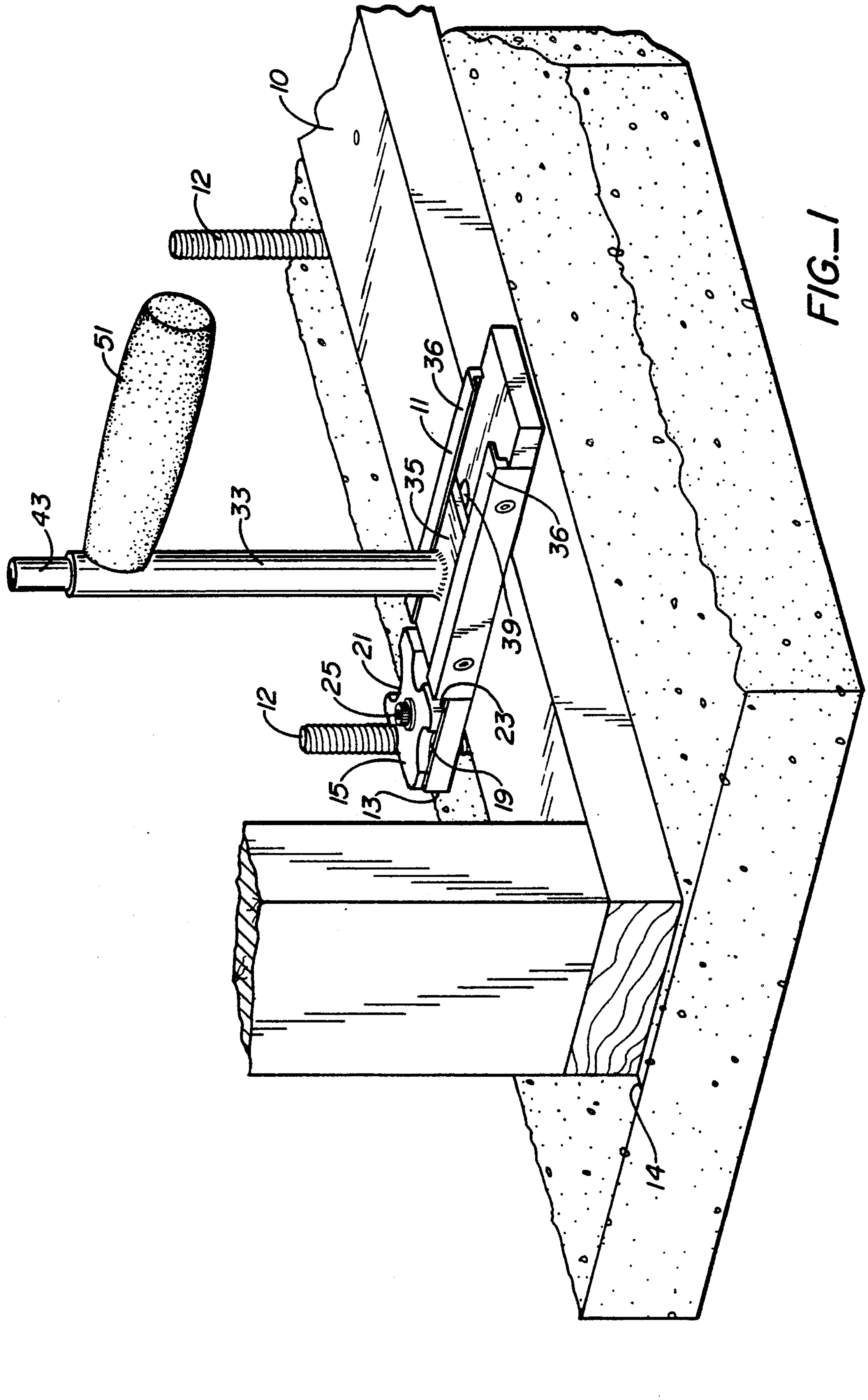
FIG. 1 is a perspective view of the present invention shown in operative position in a typical working environment.
Figure 2:
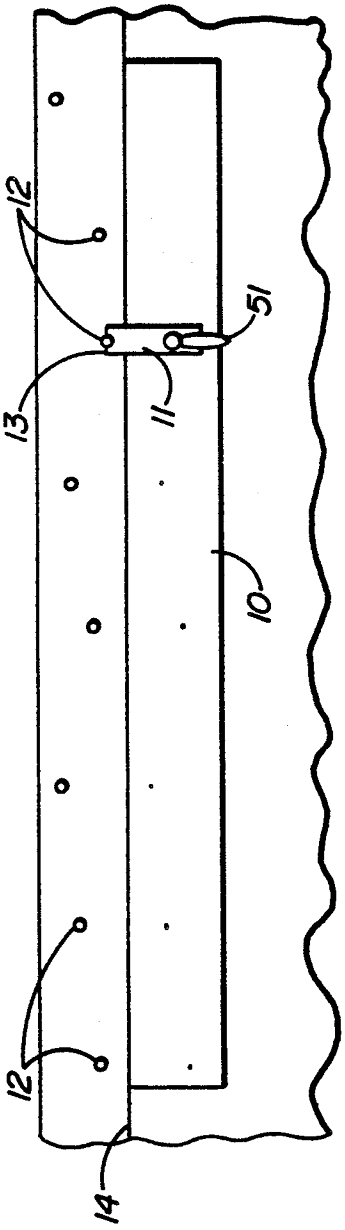
FIG. 2 is a top plan view of a building sill showing a wood plate being marked with the marking tool of the present invention in operative position thereon.
Figure 3A:
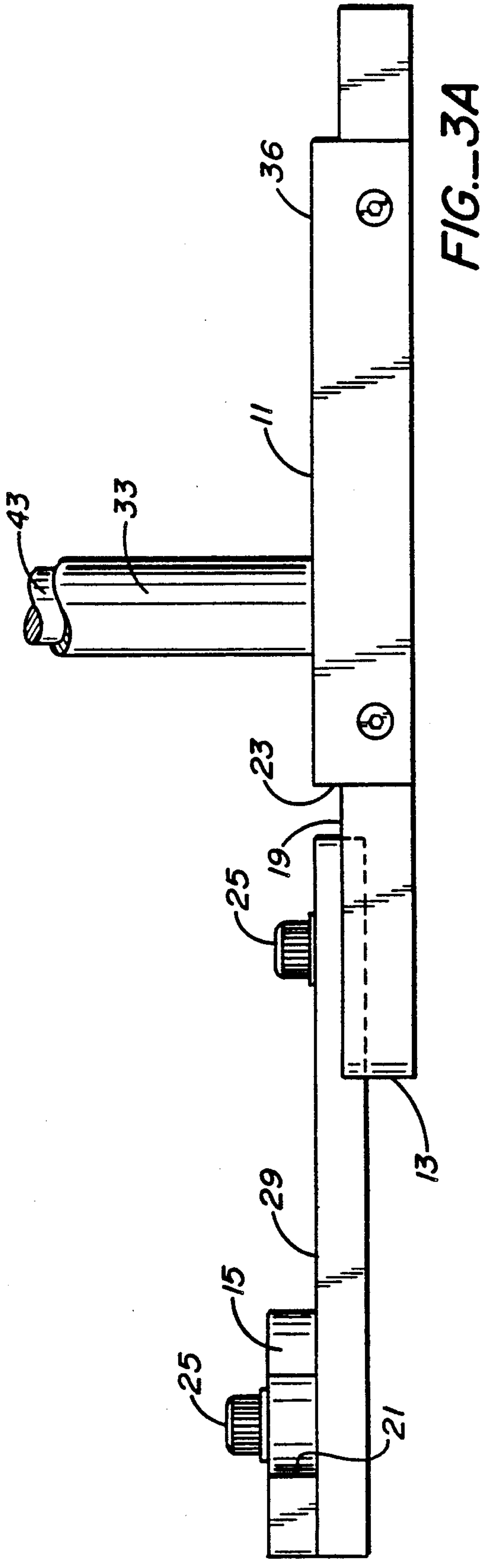
FIG. 3*a*side elevation of the invention
Figure 3:
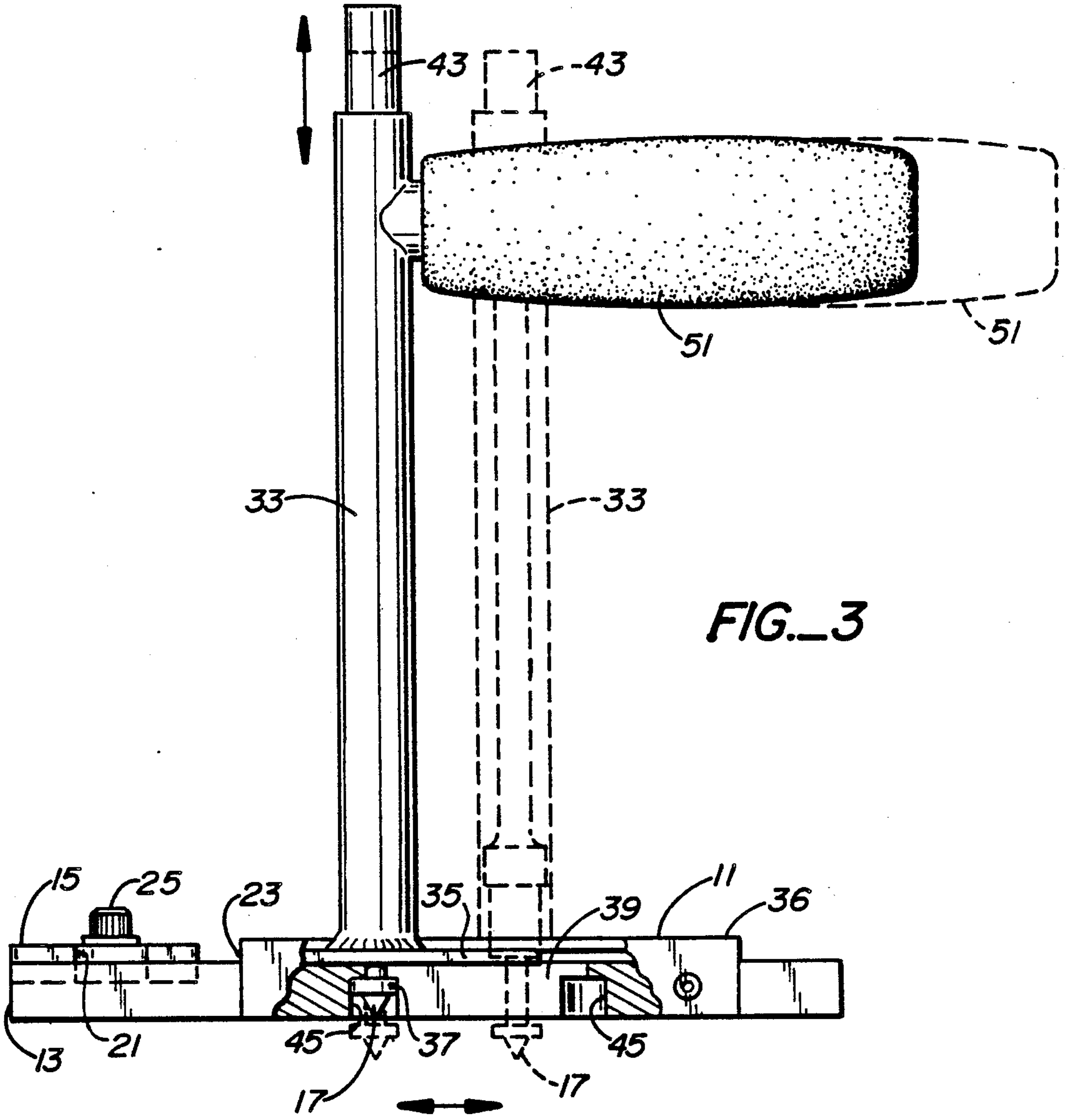
FIG. 3 is a side elevation in partial section showing the alternative positions of the marking punch of the present invention in phantom lines.
Figure 4:
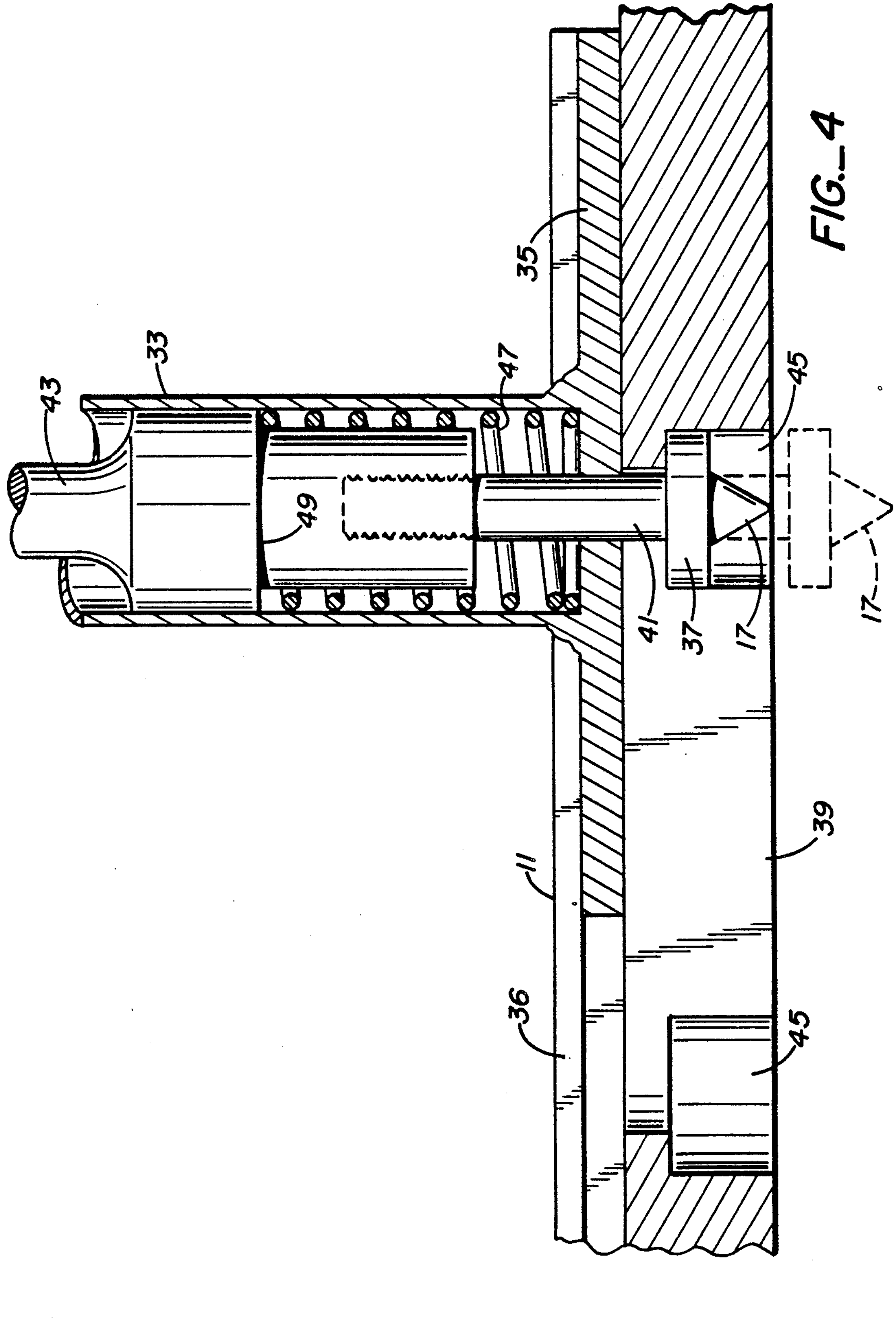
FIG. 4 is an enlarged side elevation in section of a portion of the present invention.

Reference is made to the drawings for a description of the preferred embodiment of the present invention wherein like reference numbers represent like elements on corresponding views.

The present invention is an anchor bolt or stud marker for marking the location of holes to be drilled in a wood plate to permit the plate 10 to, be placed over a series of fixed position studs 12. It comprises a base member 11 having a positioning end 13 formed integral thereto for engaging the fixed position anchor posts or bolt studs. The positioning end is provided with a variable sized locating means for contacting in close-fitting relation the studs for which the holes are to be drilled. These studs can be various sized, and so to accommodate the different diameter sizes and to accurately position the anchor bolt marker, the positioning end is provided with an indexing stud locator plate 15 that allows the central axis of the various sized studs to be positioned equidistant from the marking punch 17. For this purpose, the base member is provided with a recess 19 located at the positioning end thereof which forms the mount and support for the indexing plates. In its simplest form, the positioning end could just be provided with a slot for engaging a stud.

The indexing plates 15 are square with semi-circular reliefs 21 cut in the sides. Four smaller diameter stud size reliefs are cut into one of the indexing plates and two larger ones in another. The plates are sized to fit into the recess 19 formed on the positioning end 13 of the base member 11. The recess can be three sided, but in its simplest form has only an end wall 23 against which the indexing plates can abut. The walls of the recess provide support to the indexing plates and prevent them from rotating on their mount. The indexing plates are held in the recess by a single threaded Allen screw 25 which can be removed or loosened to rotate or change the plates to accommodate different sized studs 12. It has been found that two different sized plates will accommodate most of the basic standard sized studs used for construction in which either a two-by-four or two-by-six wood plate 10 would be utilized.

When the indexing plate 15 is utilized to locate the stud and position the stud marker, the indexing plate is positioned with one of the semi-circular reliefs 21 arranged at the end of the base member overlying an underlying larger semi-circular recess 27 formed in the base member which accommodates all of the various sized studs. If the indexing plates are removed, the underlying semi-circular relief can be utilized to accommodate an even larger sized stud than is provided for by any one of the indexing plate reliefs. Thus, the indexing means on the positioning end 13 of the base member allows the central axis of the various sized studs 12 to be positioned equidistant from the marking punch 17 when it is disposed at either of its predetermined positions of operation.

The base member 11 is formed for supporting a marking punch 17 perpendicular thereto in spaced relation to the positioning end 13 of the base member. The base member is also formed for permitting the marking punch to penetrate through the base member to mark any underlying wood plate 10 on which the anchor bolt marker is placed. The base member is also provided with means for permitting limited movement of the marking punch along the base member in adjustable spaced relation to the positioning end of the base member between at least two predetermined positions along the base member. These two predetermined positions locate the position for the punch to mark the wood plate based on the spacing from the stud 12 depending on whether the plate is a two-by-six or two-by-four piece of wood.

The stud hole marker can be modified by a simple adapter 29 to mark holes on larger standard width boards. The adapter is a simple extension plate which is secured in the recess 19 formed in the positioning end 13 of the base member with the same screw 25 that holds the indexing plate 15 in position. The free end 31 of the extension plate can either be provided with an indexing plate or a semi-circular slot for the size of stud to be marked. Different length extensions or adapters can be provided for different width boards, but each one accommodates two larger widths because of the ability of the marker to permit limited movement of the marking punch along the base member for marking two different widths of wood.

A marking punch 17 is provided which is supported in perpendicular reciprocating relation to the base member 11. It has a pointed lower end for imprinting the wood plate 10 to mark positions for the holes to be drilled therein. The means for supporting the marking punch perpendicular to the base member includes a tubular member 33 which encloses the marking punch. The tubular member is provided with a foot 35 which is engaged with the base member in captured sliding relation with limited movement along the base member which permits the marking punch to move between the two predetermined positions on the base member. The captured sliding relation includes overhanging side rails 36 on the base member which project over the foot of the tubular member and capture it but permit it to slide along the base member between the rails.

The marking punch 17 is provided with a stop means 37 formed on the lower end thereof which prevents the marking punch from being retracted through the opening in the base member 11 through which the marking punch projects to mark the wood plate 10 when it is actuated. For this purpose, the base member is provided with a slot 39 which is the means for permitting limited movement of the marking punch along the base member between at least two predetermined positions. The slot permits the lower end of the marking punch to penetrate through the base member during the time when the punch member is repositioned from one end of the slot to the other: the ends of the slot are the two predetermined positions of operation for the punch member.

The stop means is a flange 37 formed on the lower end of the marking punch 17 which is larger in size than the width of the slot 39 formed in the base member 11. The marking punch is made of two pieces so that it can be assembled by placing the operative end 41 of the marking punch through the slot and engaging it with the ram portion 43 of the marking punch which is disposed in the tubular member. These parts of the punch are assembled by means of a threaded connection.

The ends of the slot 39 in the base member 11 are formed with increased diameter recesses 45 in the bottom surface thereof which form recessed locations into which the stop means or flange 37 provided on the lower end of the marking punch 17 can be retracted.

A spring means 47 is provided for biasing the lower end of the marking punch 17 to a retracted location within the recesses 45 formed in the lower surface of the base member 11 when it is not marking hole positions on a wood plate 10. The biasing means can include simply a coiled spring disposed within the tubular member 33 which bears against the foot 3 thereof and a flange 49 formed on the ram portion of the marking punch.

The tubular member 33 is provided with a handle 51 which extends laterally outward therefrom to permit the anchor bolt marker operator to grasp the unit, pick it up, and move it. The handle also allows the operator to hold the anchor bolt marker steady while the marking punch 17 is actuated to mark a anchor bolt center on a wood plate 10 when the marking punch is hit.

In operation, the wood plate 10 is placed in position parallel the studs 12 along a chalk snap line located according to a blue print of the architect's measurements. The anchor bolt marker operator then locates the hole position from each of the studs by placing the positioning end 13 of the marker against each stud in succession using a square to align the marker on the wood plate. The hole position is marked by striking the top of the marking punch 17 with a hammer or other object to reciprocate the marking punch down into the wood plate thereby placing a small indentation in the wood for a drill bit to center on. The operator is able to move quickly along the board striking the punch as he goes, and after he has drilled the plate, it can simply be picked up and placed over the studs, and it will be accurately drilled with respect to all of the anchor bolts or studs and aligned along the snap line.

Figures 5, 6, 7, 8, 9:
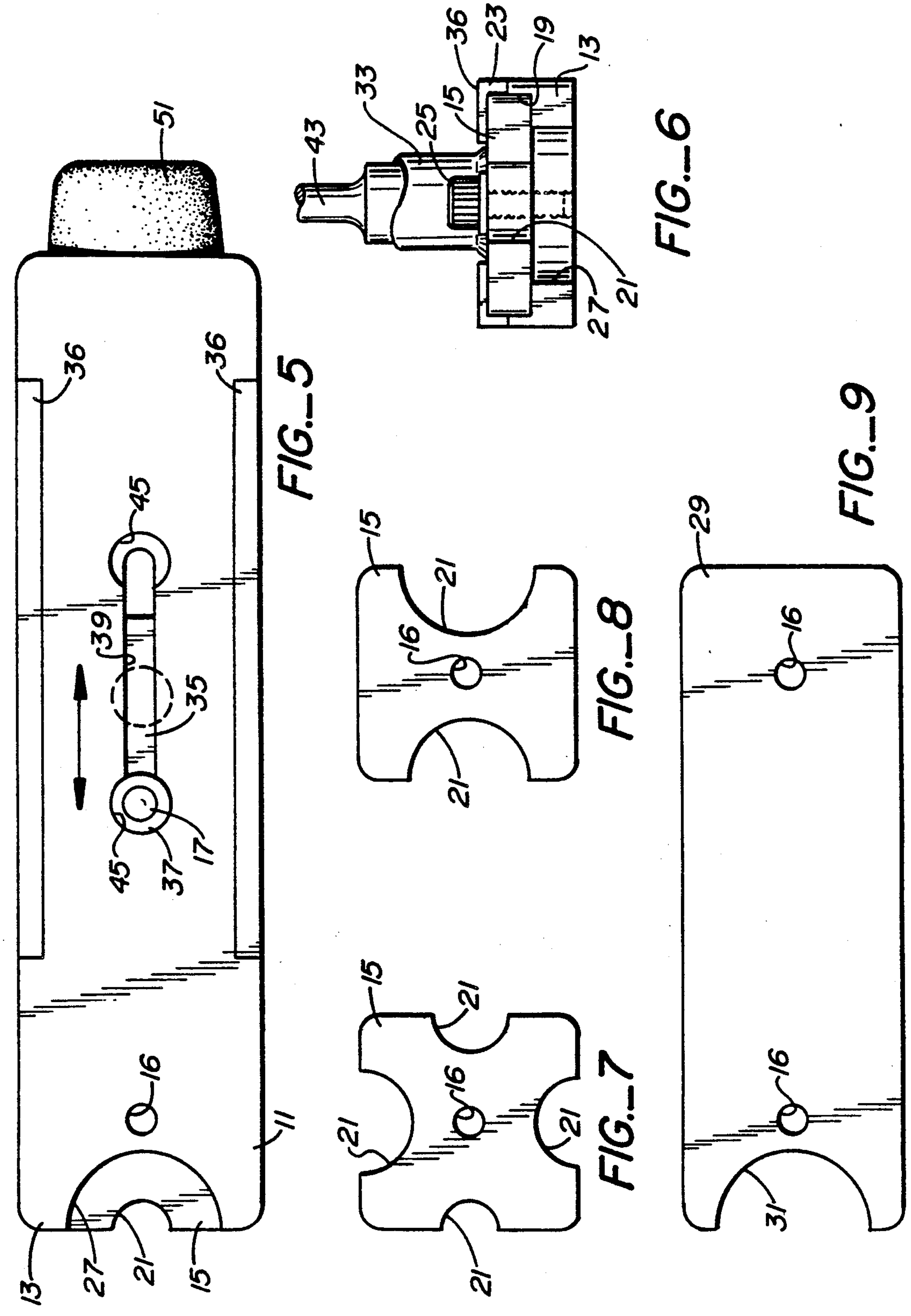
FIG. 5 is a bottom plan view of the device of the present invention.
FIG. 6 is a partial front elevation of the present invention.
FIG. 7 is a top plan view of an indexing locator element as used with the present invention.
FIG. 8 is a top plan view of another indexing locator element of the present invention.
FIG. 9 is a top plan view of an adapter for the present invention which extends the indexing locator to mark additional sizes of standard width boards.

When it is desired to switch marking from one size wood plate to another, the marking punch ram 43 is pushed down whereby the stop means or flange 37 disposed in the lower end of the base member disengages and projects from the recessed locations 45 at the ends of the slot and extends so that the foot of the tubular member 33 can be slid with respect to the base member 11 to the opposite end of the slot 39. When the pressure is released from the ram, the spring means 47 biases the stop means 37 into the other recessed location at the opposite end of the slot thereby automatically repositioning the marking punch 17 to the new location. The anchor bolt marker is then set to mark the different width wood plate. For even larger widths of plates, an extension 29 (FIG. 9) can be secured to the base member to extend the position of the indexing plates 15.

It will be apparent from the foregoing description of the invention, in its preferred form, that it will fulfill all the objects and advantages attributable thereto. While it is illustrated and described in considerable detail, the invention is not to be limited to such details as have been set forth except as may been necessitated by the appended claims.

I claim:

1. An anchor bolt marker for marking the location of holes to be drilled in a wood plate to permit the plate to be placed over a series of fixed-position studs comprising a base member having a positioning end formed integral thereto for engaging fixed position studs, said base member formed for supporting a marking punch perpendicular thereto in spaced relation to said positioning end and for permitting said marking punch to penetrate through said base member to mark the wood plate, said positioning end being provided with variable sized locating means for contacting in close-fitting relation various sized studs for which the holes are to be drilled in the wood plate, a marking punch formed for being stuck vertically downward from above by a hammer, said punch being supported in perpendicular reciprocating relation to said base member and having a lower end formed to mark positions for holes to be drilled in a wood plate, said base member being provided with means for permitting limited movement of said marking punch along said base member between at least two predetermined positions whereby said punch is mounted in adjustable spaced relation to the positioning end of said base member, and spring means for biasing the lower end of said marking punch to a retracted location within said base member when it is not marking hole positions on a plate and for returning said punch to said retracted location after it has been actuated to mark a hole position on a plate.

2. An anchor bolt marker for marking the location of holes to be drilled in a wood plate to permit the plate to be placed over a series of fixed-position studs comprising a base member having a positioning end formed integral thereto for engaging fixed position studs in close-fitting relation, the positioning end of said base member being provided with variable sized locating means for contacting various sized studs for which the holes are to be drilled in the plate, said base member formed for supporting a marking punch perpendicular thereto with means for permitting limited movement of said marking punch along said base member in adjustable spaced relation to the positioning end of said base member between at least two predetermined positions there along, a marking punch supported in perpendicular reciprocating relation to said base member and having a lower end formed to mark positions for holes to be drilled in plate members, and spring means for biasing the lower end of said marking punch to a retracted location within said base member at either of said predetermined positions when it is not marking hole centers on a plate.

3. The anchor bolt marker of claim 4 wherein the base member is provided with a slot to permit the lower end of the marking punch to penetrate through the base member when the punch member is repositioned from one end of the slot to the other, said marking punch being provided with a stop means to prevent it from being pulled through said slot by the spring means, and said base member having recessed locations formed at least at both ends of said slot as repositories for the stop means formed on the lower ends of said marking punch.

4. The anchor bolt marker of claim 4 wherein the positioning end of said base member is provided with an indexing stud locator that allows the central axis of various sized studs to be positioned equidistant from said marking punch when it is disposed at either of the predetermined positions of operation.

5. The anchor bolt marker of claim 2 wherein the means for supporting the marking punch perpendicular to said base member for reciprocating relation with respect thereto includes a tubular member which encloses said marking punch, said tubular member being secured to a foot which is engaged with said base member in captured sliding relation with limited movement there along which permits the marking punch to move between the two predetermined positions where the stop means formed on the lower end thereof can be retracted into the recessed locations in said base member.

6. The anchor bolt marker of claim 5 wherein the tubular member is provided with a handle secured thereto at a position disposed in spaced relation from said base member, said handle extending laterally outward therefrom to permit the anchor bolt marker operator to grasp the unit at a position above the working surface when the punch is to be moved or to hold it steady while the marking punch is actuated to mark an anchor bolt center on a wood plate.

7. An anchor bolt marker for marking the location of holes to be drilled in a wood plate to permit the plate to be placed over a series of fixed position studs comprising a base member having a positioning end formed integral thereto for engaging fixed position studs in close fitting relation, said base member being formed for supporting a marking punch perpendicular thereto with a slot to permit the lower end of the marking punch to penetrate through the base member when the punch member is repositioned from one end of the slot to the other, said base member having recessed locations formed at least at both ends of said slot, a marking punch supported in perpendicular reciprocating relation to said base member and having a lower end formed to mark positions for holes to be drilled in a wood plate, said marking punch being provided with a stop means to prevent it from being pulled through the slot formed in said base member, a tubular member enclosing said marking punch, said tubular member being secured to a foot which is engaged with said base member in captured sliding relation with limited movement there along which permits the marking punch to move between the two predetermined positions where the stop means formed on the lower end thereof can be retracted into the recessed locations in said base member at the opposite end of said slot, an indexing stud locator secured to the positioning end of said base member that allows the central axis of various sized studs to be positioned equidistant from said marking punch when it is disposed at either of the predetermined positions of operation, spring means for biasing the lower end of said marking punch to a retracted location within said base member at either of said predetermined positions when it is not marking hole centers on a plate, and a handle secured to said tubular member which extends laterally outward therefrom to permit the anchor bolt marker operator to grasp the unit when the punch is to be moved or to hold it steady while the marking punch is actuated to mark an anchor bolt center on a wood plate.

* * * * *